(12) United States Patent
Andersson

(10) Patent No.: US 12,006,711 B2
(45) Date of Patent: Jun. 11, 2024

(54) SCAFFOLDING ELEMENT AND METHOD FOR MANUFACTURING THE SAME

(71) Applicant: Bygginsatsen i Nacka AB, Saltsjö-Boo (SE)

(72) Inventor: Johnny Andersson, Saltsjö-Boo (SE)

(73) Assignee: BYGGINSATSEN I NACKA AB, Saltsjo-Boo (SE)

( * ) Notice: Subject to any disclaimer, the term of this patent is extended or adjusted under 35 U.S.C. 154(b) by 0 days.

(21) Appl. No.: 18/252,238

(22) PCT Filed: Oct. 25, 2021

(86) PCT No.: PCT/SE2021/051075
§ 371 (c)(1),
(2) Date: May 9, 2023

(87) PCT Pub. No.: WO2022/103313
PCT Pub. Date: May 19, 2022

(65) Prior Publication Data
US 2023/0323682 A1    Oct. 12, 2023

(30) Foreign Application Priority Data
Nov. 12, 2020   (SE) .................... 2051324-8

(51) Int. Cl.
*E04G 5/00*    (2006.01)
*B29C 44/12*   (2006.01)
(Continued)

(52) U.S. Cl.
CPC ............ *E04G 5/12* (2013.01); *B29C 44/1271* (2013.01); *E04G 1/14* (2013.01); *E04G 5/001* (2013.01);
(Continued)

(58) Field of Classification Search
CPC ........... E04G 5/12; E04G 5/001; E04G 21/28; E04G 21/24; B29C 45/14; B29C 45/1271
See application file for complete search history.

(56) References Cited

U.S. PATENT DOCUMENTS

2013/0017384 A1 * 1/2013 Lee ........................... B32B 5/18
264/46.4

FOREIGN PATENT DOCUMENTS

DE   202009010761 U1   4/2010
DE   102015016062 A1   6/2017
(Continued)

OTHER PUBLICATIONS

Swedish Intellectual Property Office (ISA/SE), International Search Report and Written Opinion of the International Searching Autority, dated Jan. 13, 2022, Stockholm, Sweden.

*Primary Examiner* — Edmund H Lee
(74) *Attorney, Agent, or Firm* — Noréns Patentbyrå AB

(57) ABSTRACT

Scaffolding element (100) with insulation, said scaffolding element (100) comprising a frame (110) of metal braces (111) and a set of fastening means (120), arranged to fasten the scaffolding element (100) to a supporting structure (20) of a scaffolding structure (10).
The invention is characterised in that the scaffolding element (100) furthermore comprises a block (130) of insulating material, and in that the block (130) is cast around the frame (110), so that the frame (110) is completely covered by said insulating material but so that the fastening means (120) are not covered by said insulating material.
The invention also relates to a manufacturing method and a kit of parts.

20 Claims, 8 Drawing Sheets

(51) Int. Cl.
  *E04G 1/14*   (2006.01)
  *E04G 5/08*   (2006.01)
  *E04G 5/12*   (2006.01)
  *B29L 31/10*  (2006.01)

(52) U.S. Cl.
  CPC ............ *E04G 5/08* (2013.01); *B29K 2905/02* (2013.01); *B29K 2905/12* (2013.01); *B29K 2995/0015* (2013.01); *B29L 2031/10* (2013.01)

(56) References Cited

FOREIGN PATENT DOCUMENTS

| | | | |
|---|---|---|---|
| GB | 2170853 A | | 8/1986 |
| JP | H06257288 A | | 9/1994 |
| JP | 2001262731 A | | 9/2001 |
| JP | 2003129654 A | | 5/2003 |
| WO | WO2015153568 | * | 10/2015 |
| WO | WO2018139674 | * | 8/2018 |

* cited by examiner

SCAFFOLDING ELEMENT AND METHOD
FOR MANUFACTURING THE SAME

The present invention relates to a scaffolding element and to a method for manufacturing the same. More particularly, the invention relates to insulated such scaffolding elements. The invention also relates to scaffolding structures comprising such a scaffolding element, and further to a kit of parts comprising such scaffolding elements.

Scaffolding structures are widely used at construction or refurnishing sites, and similar. They are frequently built in several stories, and workers tend to spend prolonged time periods on and in such temporary structures. Hence, there is a problem providing proper weather protection for scaffolding structures.

Conventionally, wind breaking walls are installed using plastic membranes. However, there is still a problem with low temperatures and moistness, in particular during the cold season in locations remote from the equator.

One problem with providing insulated scaffolding structures is that insulation itself is both bulky and heavy. Since scaffolding structures are typically tested and approved for certain well-defined uses, adding much weight will in general make such approval void.

Another problem with providing insulation on scaffolding structures is that it is complicated. It may also be difficult to achieve satisfactory levels of fire security.

The present invention solves the above described problems.

Hence, the invention relates to a scaffolding element with insulation, said scaffolding element comprising a frame of metal braces and a set of fastening means, arranged to fasten the scaffolding element to a supporting structure of a scaffolding structure, which scaffolding element is characterised in that the scaffolding element furthermore comprises a block of insulating material, and in that the block is cast around the frame, so that the frame is completely covered by said insulating material but so that the fastening means are not covered by said insulating material.

Moreover, the invention relates to a method for manufacturing an insulated scaffolding element of said type, which method is characterised in that the method comprises the steps a) providing a mold; b) providing a first scaffolding element, in turn comprising a frame of metal braces and a set of fastening means, arranged to fasten the scaffolding element to a supporting structure of a scaffolding structure; c) arranging the first scaffolding element in the mold with the frame completely contained in the mold and its fastening means protruding out from the mold; d) filling the mold with insulating material; and e) allowing the insulating material to set into solid state.

In the following, the invention will be described in detail, with reference to exemplifying embodiments of the invention and to the enclosed drawings, wherein:

FIG. 3a is a third partly cut-away perspective view of the scaffolding element shown in FIG. 2, where the cut is taken in a horizontal plane;

All Figures share reference numerals for same or corresponding parts.

Figure 1:
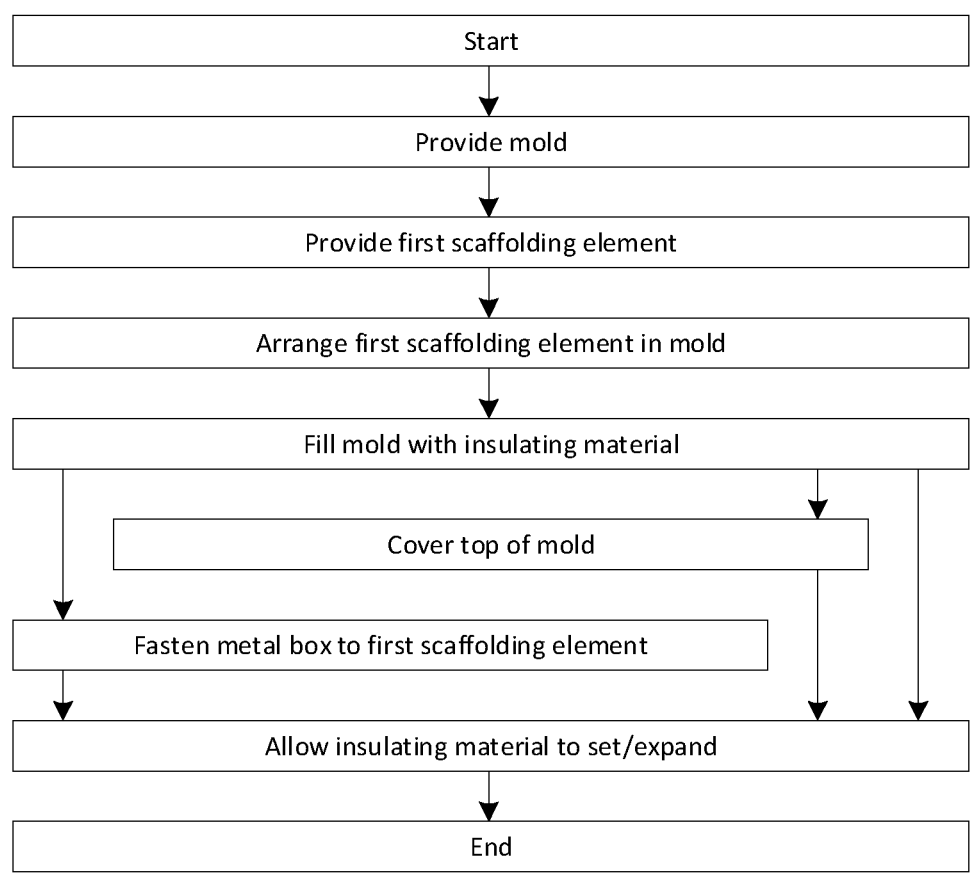
FIG. 1 is a flowchart illustrating a method according to the invention.

Hence, FIGS. 2-4b show a scaffolding element 100 according to the invention. The scaffolding element 100 comprises insulation, providing at least one of thermal and sound insulation.

Furthermore, the scaffolding element 100 comprises a metal frame 110, in particular a frame of metal braces 111, as well as a set of fastening means 120. Said fastening means 120 are arranged to fasten the scaffolding element 100 to a supporting structure 20 of a scaffolding structure 10.

The metal frame 110 advantageously directly connects fastening means 120 arranged on opposite width-wise W sides of the scaffolding element 100, preferably by a connected, rigid metal connection. The metal frame 110 may hence provide both form stability and rigidity to the scaffolding element 100 as well as a rigid support for the fastening means 120.

The scaffolding structure 10 may be a scaffolding structure 10 that comprises, or is entirely constituted by, per se conventional parts. For instance, the scaffolding structure 10 may be a construction scaffolding, such as a supported or suspended scaffolding arranged to be mounted along a wall of a building being under construction or renovation. Preferably, the scaffolding structure 10 comprises or is a supporting structure, in turn comprising standards and ledgers (see FIG. 2). The scaffolding element 100 may be arranged to fasten to said supporting structure 20, such as to said standards and/or ledgers, so as to form an integrated part of the scaffolding structure 10 (see below).

According to the invention, the scaffolding element 100 furthermore comprises a block 130 of insulating material. In FIGS. 2-4b, the block 130 of insulation material is not shown explicitly—rather a space in which the insulation is arranged is shown, for reasons of clarity. The block 130 forms an integrated part of the scaffolding element 100 by being cast around said frame 110 so that the frame 110 is covered, preferably completely covered, by said insulating material, but so that the fastening means 120 are not covered by said insulating material.

The insulating material is preferably cast around said frame 110 so that it encapsulates parts of the frame 110, as a result making it not possible to remove the frame 110 from the insulating material without breaking the insulating material. In other words, the frame 110 and the insulating material form a single, integrated component that does not admit disassembly without permanently breaking the insulating material. I some embodiments, at least 50%, or even at least 80%, of the frame 110 is encapsulated in said insulating material.

Advantageously, block 130 is substantially or completely shaped as a parallelepiped. By the word "substantially"

parallelepiped" is meant that the overall shape of the block 130 may be that of a parallelepiped, but having rounded corners or any other geometric feature not removing the overall parallelepiped shape of the block 130. Preferred shapes are rectangular cuboid shapes.

Figure 2:
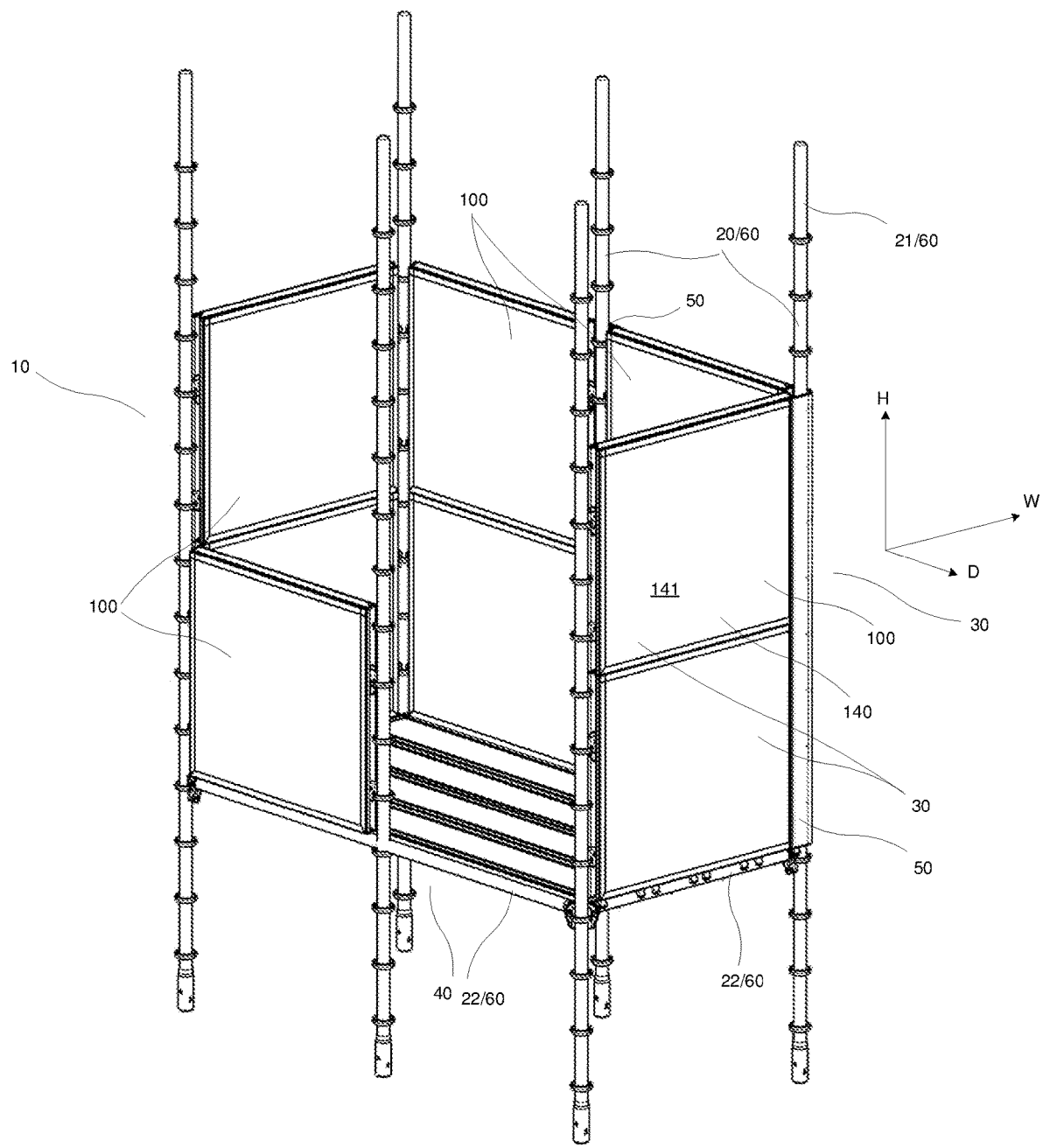
FIG. 2 is a perspective view showing a wall scaffolding element according to the invention forming a wall part of a scaffolding structure according to the invention, with an intermediary part according to the invention, as well as a floor scaffolding element according to the present invention.

In preferred cases, the scaffolding element 100 is arranged to form part of a barrier of the scaffolding structure 10, such as a barrier between an inside/indoors volume defined by the scaffolding structure 10 and an outside/outdoors volume defined by the scaffolding structure 10. For instance, the scaffolding element 100 may be arranged to form a wall, ceiling or floor part of the scaffolding structure 10. In this case, the scaffolding element 100 will have a width W, a height H and a depth D. Herein, the depth direction D is defined as a direction running from "inside" to "outside" in such a scaffolding structure 10 in which the scaffolding element 100 is mounted to form a part. In other words, the scaffolding element 100 may be arranged to form part of an external barrier of the scaffolding structure 10. Such a barrier may also be an internal barrier, such as a barrier forming a wall between two separated spaces within the scaffolding structure 10. Note that FIG. 2 shows several examples of such scaffolding elements 100, and that the directions W and D are not applicable to all scaffolding elements 100 shown therein.

Such a barrier between indoors/inside and outdoors/outside may also be arranged at a local temperature gradient, so that the scaffolding element 100 achieves a thermal insulation between two spaces of different temperature, separated by the scaffolding element 100 in question. For instance, the indoors/inside volume may be a heated volume, while the outdoors/outside volume may be a non-heated volume.

The width W and the height H directions are both perpendicular to the depth direction D, spanning a main extension plane of the scaffolding element 100. The scaffolding element 100 is then arranged to form such a wall, ceiling or floor part essentially covering a hole of the scaffolding structure 10 extending across said main extension plane of the scaffolding element 100. Normally, the scaffolding element 100 would have a shape which is generally flat along said main extension plane. It is noted, however, that the scaffolding element 100 may also define an essentially curvilinear shape, such as arranged to cover a corner or curved part of an external barrier of the scaffolding structure 10.

Then, the corresponding may be said regarding the frame 110, that may also be generally flat or curvilinear along a main extension plane along the width W and height H directions. The block 130 may be associated with a width W and a height H substantially or entirely corresponding to the corresponding width W and height H of the frame 110. This way, the shape of the block 130 essentially follows the general shape of the frame 110, encapsulating a shape-defining part of the frame 110 (preferably all such general shape defining parts of the frame 110) and forming a wall, ceiling or floor part having an overall shape adapted to form said barrier.

It is noted that the "height" H of the scaffolding element 100 may be directed differently in a global coordinate system, depending on the mounting orientation of the scaffolding element 100. For instance, if the scaffolding element 100 is mounted as a floor element, the height H may be directed horizontally, while it may be directed vertically if the scaffolding element 100 is mounted as a wall element of a substantially vertical wall. The width W of the scaffolding element 100 may be horizontally directed both when the scaffolding element 100 is mounted as a part of a vertical wall as well as a horizontal floor or ceiling.

The block 130 may have a total depth D which is at least 10 cm, such as at least 20 cm. The depth D of the block may be at the most 60 cm, such as at the most 50 cm.

The width W and height H of the block 130 may both be less than said total depth D. Preferably, the width W and/or the height H of the block 130 are at least 5 times, or even times, the corresponding depth D of the block 130.

The total width W of the block 130 may be at least 40 cm, such as at least 60 cm. The total width W of the block 130 may furthermore be at the most 200 cm, such as at the most 150 cm.

The total height H of the block 130 may be at least 50 cm, such as at least 80 cm. The total height H of the block 130 may be at the most 300 cm, such as at the most 200 cm, such as at the most 120 cm.

As will be explained in further detail below, in connection to the description of the present method, said insulating material is an expanded or foam plastic material, such as PIR (polyisocyanurate) foam. The insulating material may comprise a fire retardant, anti-molding compounds and so forth.

According to a preferred embodiment, and as illustrated in FIGS. 3a-4b, the insulating material block 130 is covered on at least one side, preferably on at least three sides, preferably on at least five sides, and most preferably on all sides, with a metal or rigid plastic foil material 141, such as sheet metal. The foil material 141 may be at least 0.5 mm, such as at least 1 mm, thick. It may also be at the most 5 mm, such as at the most 3 mm, thick. It may also form a closed space accommodating the insulating material of said block 130. The closed space may then have through holes for the fastening means 120 to protrude outside of the closed space. Moreover, the closed space may be arranged with no additional through holes apart from said through holes. In case the foil material 141 is metal, it may be a corrosion-resistant metal such as stainless steel.

It is generally preferred that there is no, or at least substantially no, air between the block 130 and the foil material 141.

In particularly preferred embodiments, the block 130 of insulating material is encapsulated in a metal box 140 formed by said foil material 141. The metal box 140 may then be rigidly fastened to the fastening means 120. It is realized that said closed space encapsulating the block 130 of insulating material may then be completely closed by the combination of the metal box and the fastening means 120 protruding through the foil material 141 and sealingly closing the closed space. This way, by allowing the fastening means 120 to project through the foil material 141 in a sealing manner, the closed space may be closed in a way which is water-tight or even gas-tight, while still allowing the frame 110 to be partly encapsulated by the insulting material as described above. For instance, a joint between the fastening means 120 and the metal box 140 may be accomplished by welding so as to form a structure, defined by the combination of the frame 110 (with its fastening means 120) and the metal box 140, that is completely sealed in terms of its encapsulated closed space.

In other examples, the metal box 140 may completely and sealingly encapsulate the frame 110, and the fastening means 120 may then be fastened to an external surface of the metal box 140. This avoids said through holes, but may result in a weaker overall structure.

The fastening means 120 may be conventional as such, for instance comprising fastening screws or quick-connection means arranged to rigidly but disconnectably connect to a cylindrical metal scaffolding standard or ledger of standard type.

As is illustrated in FIG. 2, the scaffolding element 100 may be a wall element arranged to be used as a wall element in a scaffolding structure 10. In other words, the scaffolding element 100 will, when mounted in a scaffolding structure 10, form a part of a wall structure of said scaffolding structure 10. Then, the fastening means 120 may comprise four (or more) fasteners for fastening the wall element in question to a vertical supporting structure 21, such as a vertical standard, of said scaffolding structure 10.

In another example, also illustrated in FIG. 2, the scaffolding element 100 is a floor element, with the corresponding interpretation. Then, the fastening means 120 may comprise four (or more) fasteners for fastening the floor element in question to a horizontal supporting structure 22, such as a horizontal ledger, of the scaffolding structure 10.

In order to be able to mount the scaffolding element 100 as a wall and/or floor and/or ceiling element in the scaffolding structure 10, the width W and the height H of the scaffolding element 100 is typically adapted to standard measures of the scaffolding structure 10. In particular, the respective width W and height H distance between opposing fastening points as defined by said fastening means 120 is adapted to an intra-standard and/or intra-ledger distance of the scaffolding structure 10. Such scaffolding structure geometries are standardized within the industry, and will not be dwelled upon any further herein.

It is realized that several scaffolding elements of the general type described herein may be used in one and the same scaffolding structure 10, and forming one or several wall elements and/or one or several floor or ceiling elements in said scaffolding structure 10, as the case may be.

The present invention furthermore relates to a scaffolding structure 10 of said type, comprising at least one scaffolding element 100 according to the above, mounted as a part of said scaffolding structure 10 as a respective floor, ceiling or wall element as described above and as illustrated in FIGS. 2 and 3.

In particular, the scaffolding structure 10 may comprise at least one wall 30, such as a vertical wall, in turn comprising several scaffolding elements 100 as mounted wall parts. The wall 30 surface may to at least 50%, such as to at least 70%, be covered by the insulation material of the respective scaffolding elements 100.

In additional or supplemental embodiments, the scaffolding structure 10 may comprise at least one ceiling or floor 40, such as a horizontal ceiling or floor, in turn comprising several scaffolding elements 100 as mounted ceiling or floor parts. The ceiling or floor 40 surface may to at least 50%, such as to at least 70%, be covered by the insulation material of the respective scaffolding elements 100.

Figure 3A:
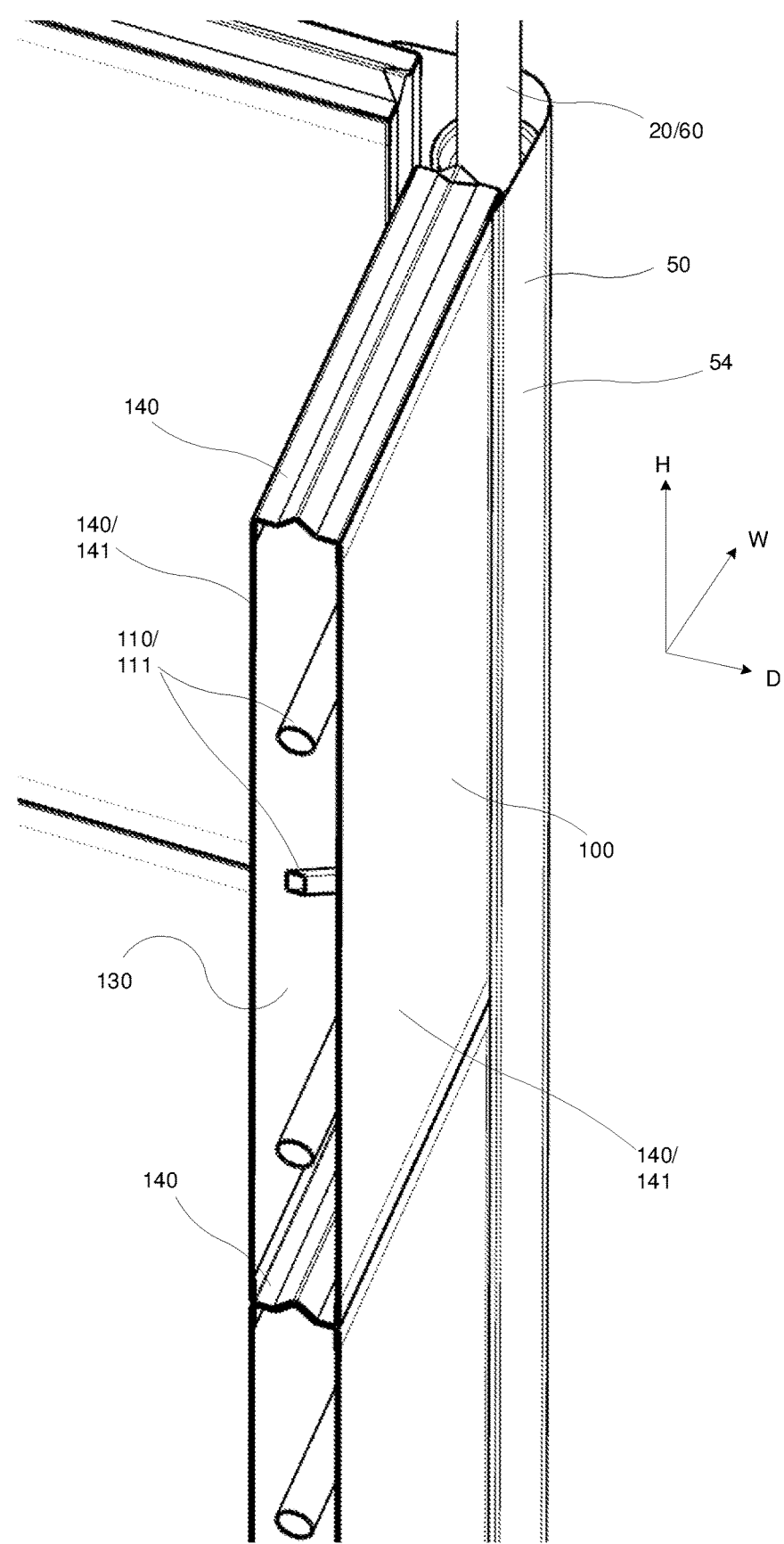
FIG. 3a is a first partly cut-away perspective view of the scaffolding element shown in FIG. 2, where the cut is taken in a first vertical plane.
Figure 3B:
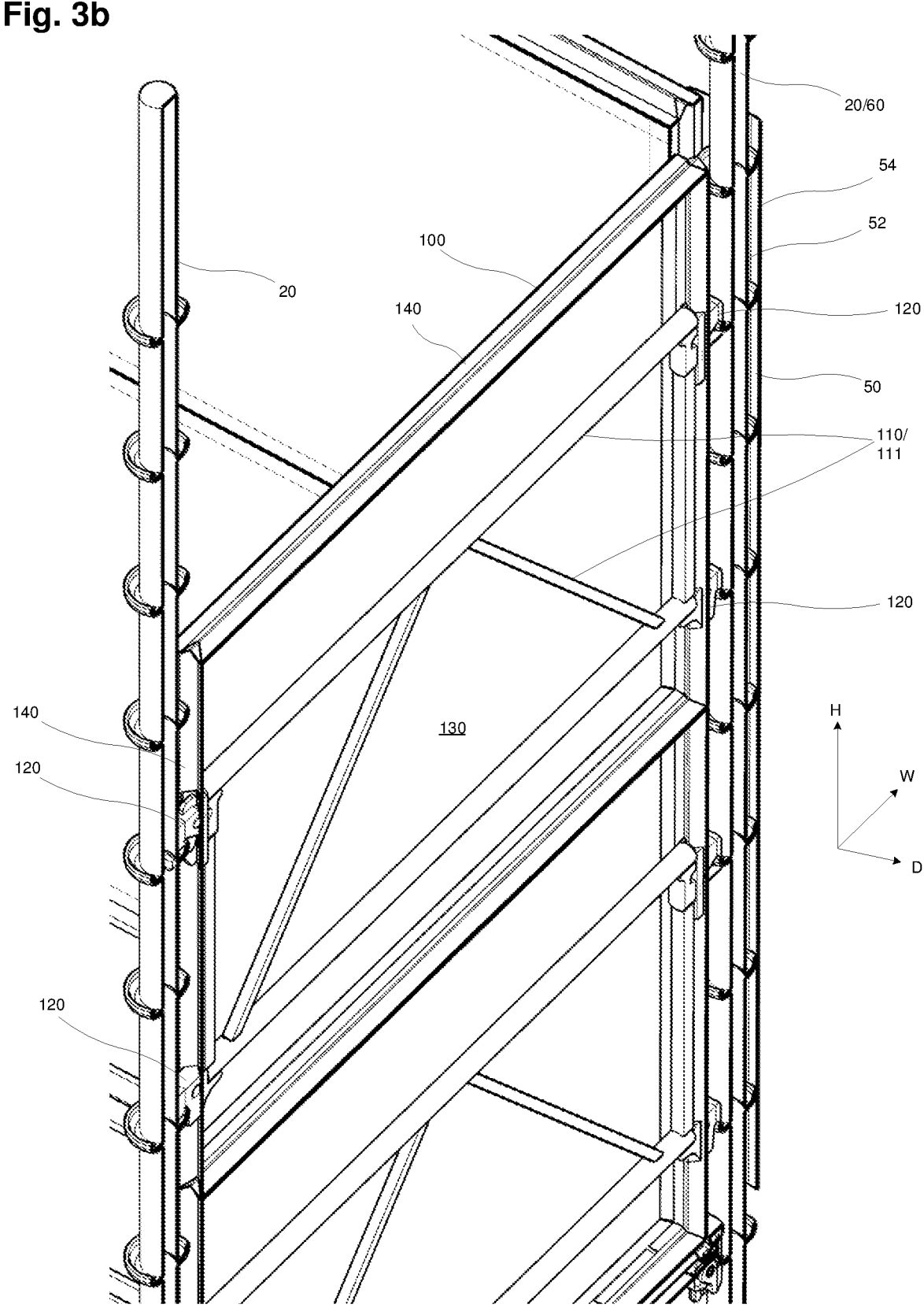
FIG. 3c is a second partly cut-away perspective view of the scaffolding element shown in FIG. 2, where the cut is taken in a second vertical plane, perpendicular to said first vertical plane.
Figure 3C:
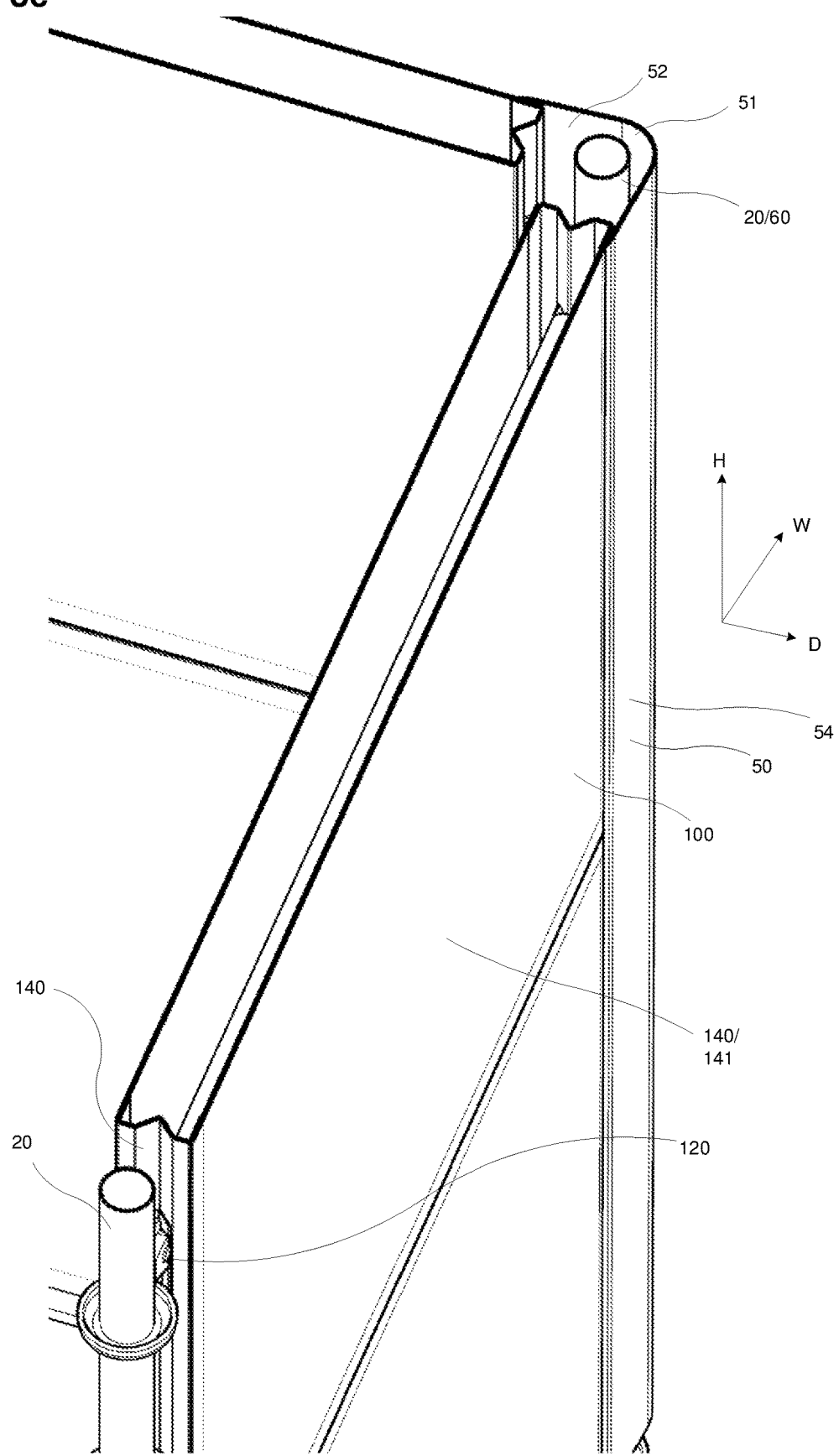
Figure 4A:
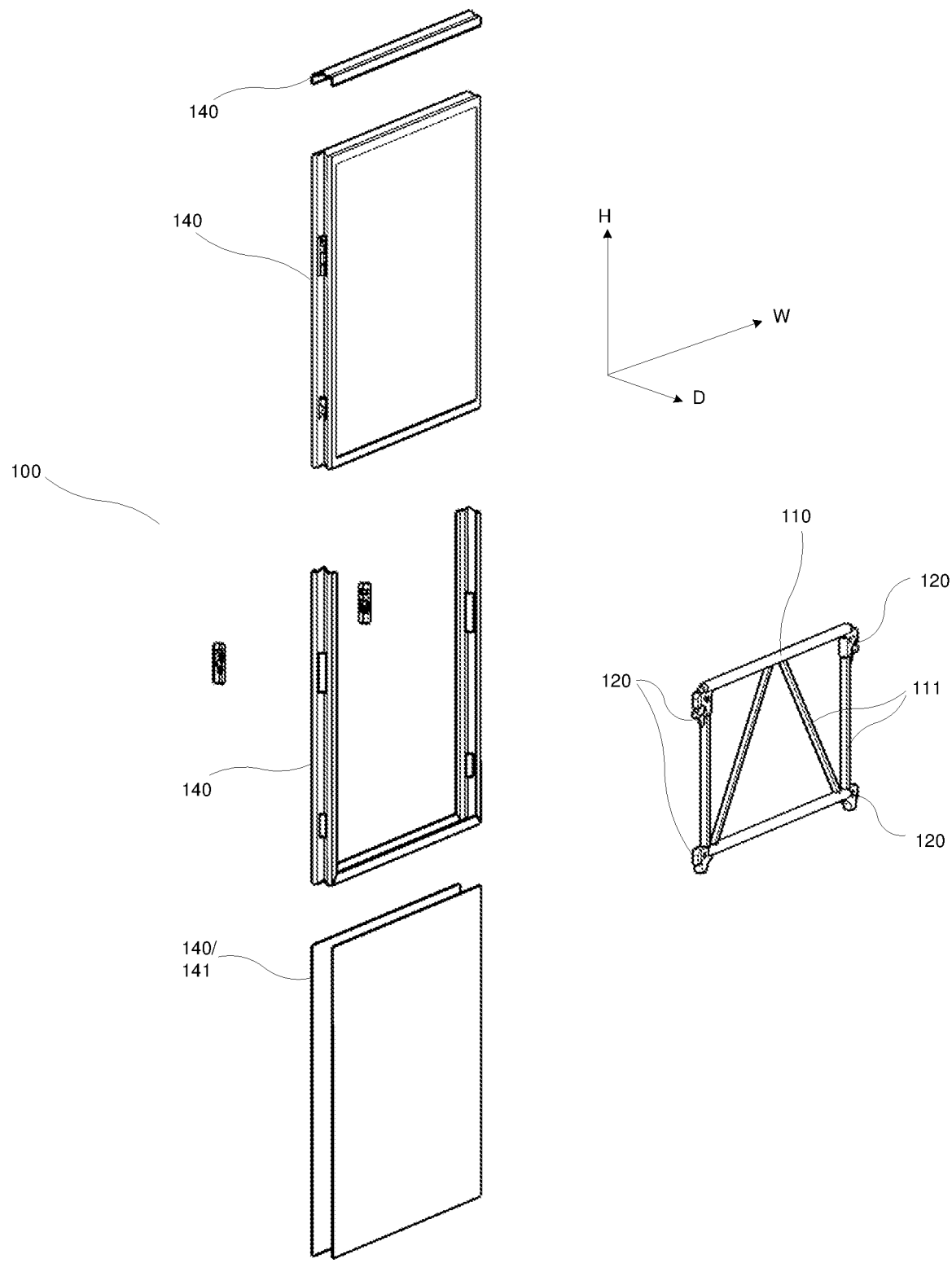
FIG. 4a is an exploded view of said wall scaffolding element.
Figure 4B:
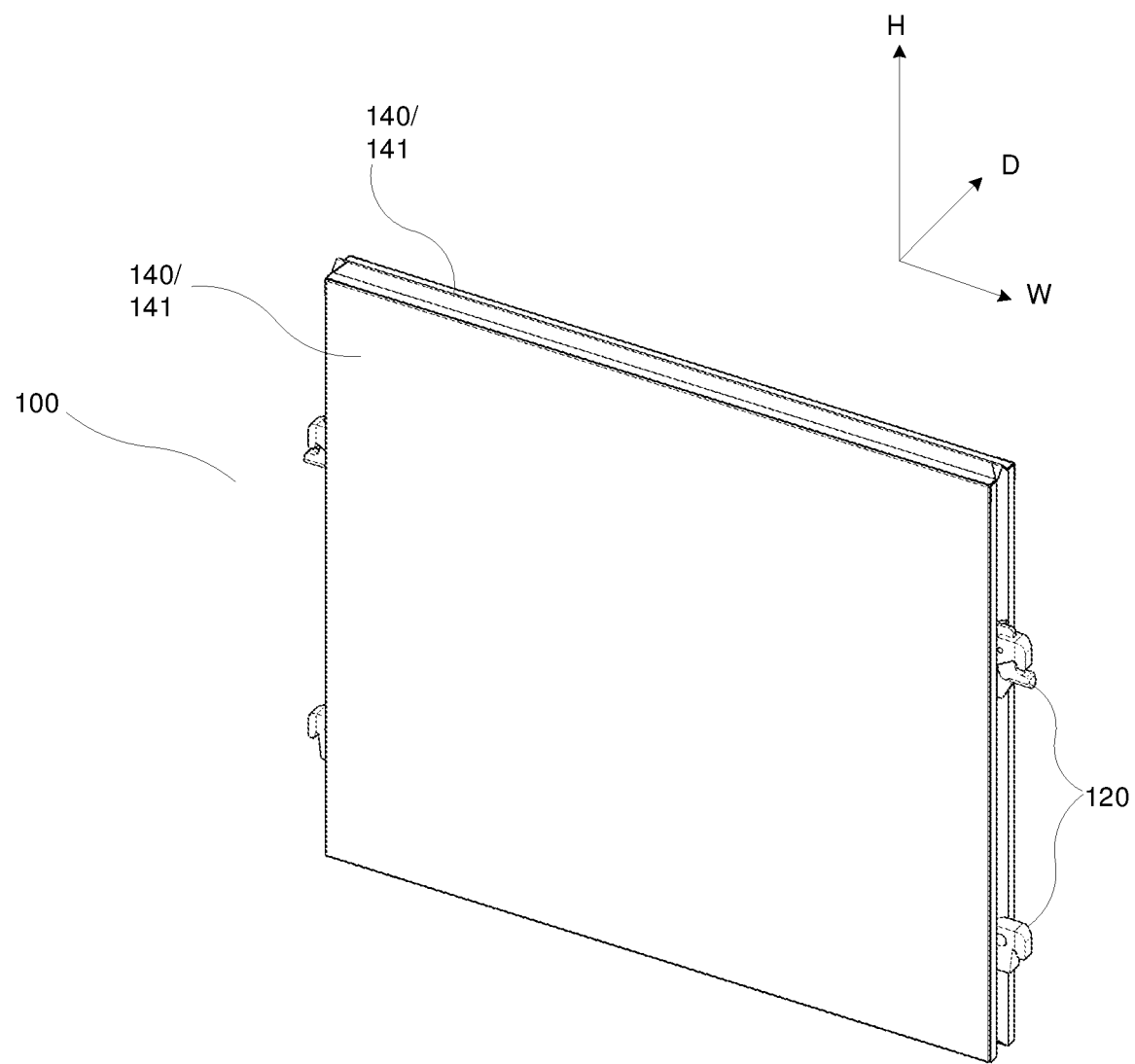
FIG. 4b is an assembled view of said wall scaffolding element.

FIGS. 2-3c also illustrates a further preferred embodiment, applicable in case several scaffolding elements 40 mounted on either side of a standard or ledger of the scaffolding structure 10. In this case, the area around said standard or ledger may be covered by an additional part, in the form of an intermediate, insulated part 50 which is then also comprised as a mounted part of the scaffolding structure 10. Even though FIGS. 2-3c only show intermediate parts 50 being a part of a wall, it is realized that the corresponding principles may be applied to a floor or ceiling intermediate part, and/or to a joint between a wall and a ceiling/floor.

Hence, in this case the scaffolding structure 10 may comprise at least one, preferably several, such intermediate insulated parts 50, each provided between a respective pair of two consecutively mounted scaffolding elements 100 of the type described herein and also forming part of the scaffolding structure 10, said scaffolding elements 100 being arranged in parallel or at an angle (such as 90°) one to the other.

Furthermore, each intermediate part 50 in question may then be arranged to be fastened (and as a matter of fact mounted when in a mounted state in the scaffolding structure 10) to a cylindrical supporting structure 60 of the scaffolding structure 10, such as the mentioned standard or ledger.

Then, the intermediate part 50 may be arranged to connect to said two consecutive scaffolding elements 100, hence creating, together with the two consecutive scaffolding elements 100, a connected insulated wall, ceiling or floor.

In this embodiment the intermediate part 50 hence connects to the standard or ledger 60, and also to the respective scaffolding elements 100. This way, only one, or even none, of the adjacent scaffolding elements 100 may connect directly to the cylindrical supporting structure 60 of the scaffolding structure 10, but instead only connecting to the intermediate part in turn providing a rigid connection between the cylindrical supporting structure 60 (standard or ledger) and the scaffolding element 100 in question.

Alternatively, each of the scaffolding elements 100 may be arranged to connect directly to the cylindrical supporting structure 60 (adjacent scaffolding elements 100 then connecting to one and the same standard or ledger). Then, the intermediate part 50 may not connect directly to the cylindrical supporting structure 60, but instead connect rigidly to each of said adjacent scaffolding elements 100. This latter is the example illustrated in FIGS. 2-3c.

Irrespectively, it is preferred that it is the respective fastening means 120 of said adjacent scaffolding elements 100 that connects to the cylindrical supporting structure 60 or the intermediate part 50, as the case may be.

To accomplish this, the intermediate part 50 may comprise a cylindrical part having dimensions (primarily cylinder diameter and cylinder shape) corresponding to those of a standard-type standard and/or ledger, so that a scaffolding element which is arranged to connect to a standard or ledger using the fastening means 120 can use the same fastening means 120 to instead connect to an intermediate part 50 of the type described herein.

Furthermore, the intermediate part 50 comprises a block of insulation 52, which may be of the general type described in relation to the scaffolding element 100 and which may be cast around (to enclose part of) a load-bearing frame of the intermediate part 50. The intermediate part 50 may also comprise a foil material covering 54, such as a metal box of the general type described above in connection to the scaffolding element 100.

It is noted that, in a way corresponding to block 130, the insulation block 52 is not explicitly shown in the Figures, but instead a space in which the block 52 is arranged.

As is also illustrated in FIGS. 3a-3c, the intermediate part 50 may comprise a through channel 51 for pipes or cables. This through channel 51 may run through said metal covering 54, and may run in a direction which is parallel to that of a closest cylindrical supporting structure 60 to which the intermediate is directly or indirectly (via scaffolding element 100) rigidly connected.

FIGS. 1 and 5a-5c illustrate a method according to the present invention, for manufacturing an insulated scaffolding element 100 of the type described herein.

In a first step, the method starts.

Figure 5A:
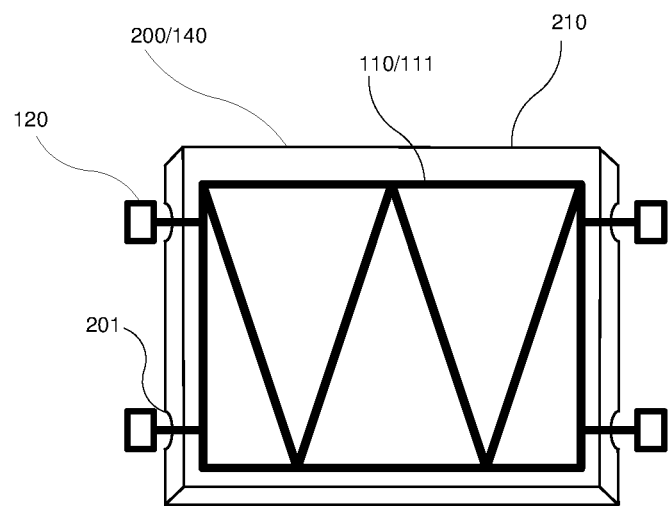
FIG. 5a shows a mold according to the invention in an open state.

In a subsequent step, a mold 200 is provided, as illustrated in FIG. 5a. The mold 200 is a mold for casting the insulating material block 130 of a scaffolding element 100 as described above. After a liquid material filled into the mold 200 has allowed to set into solid state, the mold 200 is either removed, for being reused for casting a next insulating block 130, or may be kept as an integrated part of the scaffolding element 100 in question. This will be described below.

In a subsequent step, a first scaffolding element 100 is provided, which lacks the insulating material block 130 to be cast. However, at this point in the manufacturing process the first scaffolding element 100 comprises a frame 110, of the type described above, comprising metal braces 111. The scaffolding element 100 also comprises a set of fastening means 120 of the above-described type, in turn arranged to fasten the scaffolding element 100 to a supporting structure 20 of a scaffolding structure 10 of said type. In other words, at this point in the manufacturing process, the first scaffolding element 100 may be made entirely of metal material.

In a subsequent step, the first scaffolding element 100 is placed in the mold 200, with the frame 110 completely contained in the mold 200 and its fastening means 120 protruding out from the mold 200. The mold 200 may comprise through holes 201 arranged to allow the fastening means 120 to protrude out through the mold 200 wall.

FIG. 5a illustrates a first part 210 of the mold 200 having received the frame 110.

For instance, the mold 200 may comprise two or more rigid mold subparts 210, 220, and cooperating edge parts of adjacent such mold subparts may be shaped so as to together form said through holes 201 for the fastening means 120 when the subparts are joined together to form the mold 200. Alternatively, such mold subparts 210, 220 may be provided with flexible edges, such as made from rubber or similar, so as to yield sufficiently for the fastening means 120 to protrude between such flexible edges while still providing sufficient sealing for keeping the liquid insulating material inside the mold 200 before setting.

Figure 5B:
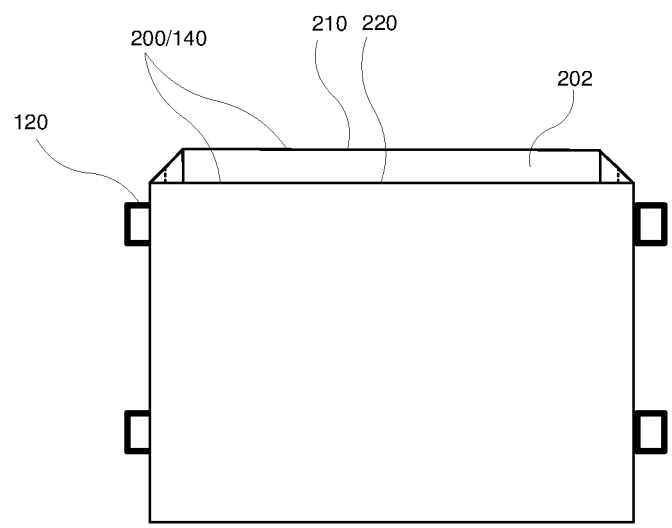
FIG. 5b shows said mold in a closed state.

FIG. 5b illustrates this assembled mold 200.

In a subsequent step, the mold 200 is filled with insulating material, preferably liquid insulating material.

In a subsequent step, the filled insulating material is allowed to set in the mold 200, into a solid state. Preferably, the insulating material is an expanded polymer material, and the setting involves the development of gas bubbles within the insulating material so as to form said expansion.

The setting hence results in the solid-state insulating material block 130 enclosing the frame 110, with the fastening means 120 protruding out from the block 130 and the mold 200. Preferably, the filling, setting and/or expansion process achieves that the insulating material completely fills at least a lower part, such as substantially the whole, mold 200.

Then, the method ends.

In some embodiments, the mold 200 may be open upwards. Then, the liquid insulating material may be provided down from above into the mold 200, via the upwards opening 202, as a liquid foam material of the above-described type.

Then, in an additional method step, a top of the mold 200 may be covered, such as using a metal top cover 203, so that the covered mold 200 forms a closed encapsulating structure in relation to the insulating material, only having the fastening means 120 protruding out from the mold 200 as described above.

Figure 5C:
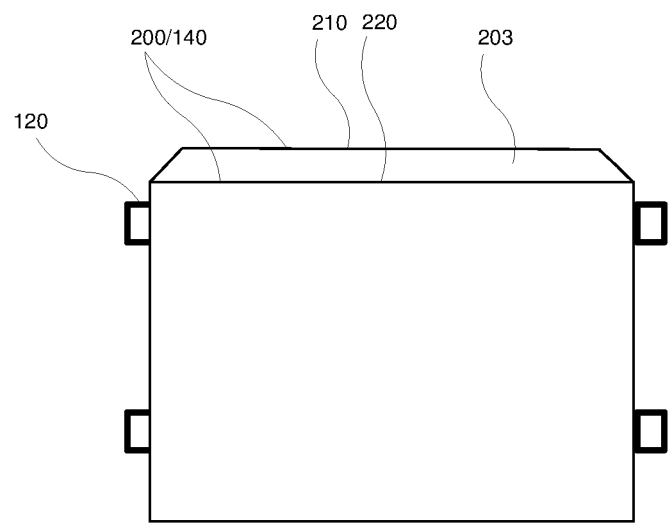
FIG. 5c shows said mold in said closed stat with a top.

This is illustrated in FIG. 5c.

In preferred embodiments, the mold 200 is a hollow metal box 140 of the above type, which may be assembled from two or more subparts 210, 220 as described above and/or be open upwards and arranged to be covered by a metal top cover 203. Preferably, the mold 200 comprises metal parts arranged to completely enclose the insulating material apart from the protruding fastening 120 as described above.

Then, the method may further comprise rigidly fastening the metal box 140 in question to the first scaffolding element 100. This rigid fastening may be via the block 130 of insulating material enclosing the frame 110 and being rigidly connected to the mold 200 due to the setting of the insulating material. The rigid fastening may also be a direct fastening, such as at the points of contact between the protruding fastening means 120 and the metal box 140, such as these contact points being welded together. The rigid fastening may be performed before or after the setting of the insulating material. It is also realized that the fastening means 120 may be fastened to the outside of the box 140/the assembled mold 200, in which case through holes 201 are not required.

Regarding the metal box 140, it may be made from stainless steel or aluminium sheet material. This sheet material may be at least 0.5 mm, such as at least 1 mm, thick. Furthermore, it may be at the most 5, or at least 3 mm, of thickness.

In order for the scaffolding element 100 to be able to fulfil its purpose as a wall, ceiling or floor element that fits into an existing or constructed scaffolding structure 10, which scaffolding structure 10 is preferably a conventional, standard scaffolding structure 10 that is retrofitted with the scaffolding element 100, the first scaffolding element 100 will generally have standard dimensions with respect to the location of said fastening means 120. In particular, the fastening means 120 are arranged with fastening points arranged to fasten to standards and/or ledgers arranged at standardised locations according to a standardised scaffolding system. Here, it is important that such fastening points of different fastening means 120 of one and the same scaffolding element 100 are arranged at certain predetermined, standard distances from each other in the width W, and possibly also in the height H, directions.

According to another aspect of the present invention, the invention relates to a kit of parts for a scaffolding structure 10 of said type. The kit of parts comprises at least two scaffolding elements 100 of the present type, each arranged to form wall, ceiling or floor parts. Preferably, the kit of parts comprises both a scaffolding element 100 arranged to form a wall part of the scaffolding structure 10 and a scaffolding element 100 arranged to form a floor part of the scaffolding structure 10. In some embodiments, depending on the geometric location of fastening points in the scaffolding structure 10, one and the same scaffolding element 100 may be suitable for use either as a wall element or as a floor element.

Furthermore, such a kit of parts may comprise at least one intermediate, insulated part 50 of the type described above, arranged to be provided between two scaffolding elements 100 of said kit of parts, said two scaffolding elements being arranged to be provided as two consecutive, adjacent scaffolding elements 100 in said scaffolding structure 10. Then, said intermediate part 50 may be arranged to be fastened to a cylindrical supporting structure 60 of the scaffolding structure 10 and to connect to said two consecutive scaffolding elements 100, hence creating, together with the two consecutive scaffolding elements 100, a connected insulated wall, ceiling or floor.

Hence, the scaffolding structures and methods described herein solve the initially mentioned problems. In particular, they provide a convenient and simple way to provide proper weather protection for scaffolding structures without having to redesign scaffolding structures of standard types. In particular, scaffolding elements 100 of the present type can be used to retrofit an existing scaffolding structure 10 with properly insulated walls, ceilings and/or floors.

The scaffolding element 100, with its insulating material, forms a structure that provides both a moisture-resistant and wind-protecting wall, ceiling a floor part and also provides thermal insulation. By providing the insulating material block 130 as an integrated part of the scaffolding element 100, it can be provided without its bulkiness constituting a problem in term of it disturbing any activity desired to be conducted on and in the scaffolding structure 10. The frame 110 is the load-carrying part of the scaffolding element 100, a function that is not compromised by the provision of the insulation block 150 since the block 150 is arranged around (possibly encapsulating) the frame 110, in turn running between the fastening means 120 the above-described way.

One important insight is that the present scaffolding element 100 allows for using an existing scaffolding system as-is, so that existing certificates and tests are still valid even when using the scaffolding element 100 as an integrated part of a scaffolding installation constructed using the existing scaffolding system. This can be achieved by the frame 110 fulfilling structural requirements on wall, ceiling or floor parts, in terms of load resistance and so forth. It is particularly noted that the insulating material does not deteriorate such load resistance since the frame 110 runs all the way between opposite fastening means 120 as described above.

The metal box 140 may also add to the structural integrity of the scaffolding element 100 as a whole. Moreover, the metal box 140 will generally add to the shear and twisting resistance to the whole scaffolding structure 10.

Often, a total load resistance of the scaffolding structure 10 is calculated based on given scaffolding system-specific parameters and the selected structure 10 design. Since using the present scaffolding element 100 will at least not decrease the load resistance, and will also not add much weight to the structure 10, the same calculations as when not using the present scaffolding element 100 will still be valid for the final structure 10.

Using the metal box 140 as described above, the scaffolding element 100 can also be arranged with sufficient fire resistance.

The scaffolding element 100 may be designed with dimensions allowing it to function as a handrail, extending between a scaffolding structure 10 floor and 80-110 cm upwards. Alternatively, the scaffolding element 100 may be designed to cover an entire wall, between two floors of the scaffolding structure 10.

An external surface formed on the scaffolding element 100 may be used for printed, projected or electronically displayed messages, such as commercial of informational messages. For instance, the scaffolding element 100 may be provided with a computer display, fed via cabling in said intermediary part 50 as described above.

In some embodiments, the metal box 140 may be arranged with detachable fastening means 120, so that the fastening means 120 can be replaced as a function of varying types of scaffolding systems without having to remanufacture an entire scaffolding element 100 but rather allowing the scaffolding element 100 to be used with several different types of scaffolding systems. Such replaceable fastening means 120 may be fastened to the metal box 140 using cooperating engagement means, such as screws, providing sufficient load resistance so that no consideration has to be taken regarding any weakening resulting from said cooperating engagement means in order to determine a total load-bearing resistance for the entire scaffolding structure 10.

Such coopering engagement means may also comprise a hinge mechanism on one width-direction W side of the scaffolding element 100 and a locking mechanism on an opposite side. This way, the entire scaffolding element 100 may be arranged to function as an openable door for accessing the scaffolding structure 10. This principle may also be applied generally to the scaffolding elements 100 described herein, in that two or more of the fastening means 120 arranged on one width-direction W side of the scaffolding element may be provided with a hinge function, allowing the scaffolding element 100 to swing open once installed in the structure 10.

The metal box 140 may also itself be arranged with an integrated door or similar openable parts, allowing the metal box 140 to be temporarily openable for ventilation and service.

Above, preferred embodiments have been described. However, it is apparent to the skilled person that many modifications can be made to the disclosed embodiments without departing from the basic idea of the invention.

For instance, each scaffolding element 100 according to the invention may comprise further parts and details. The scaffolding element 100 may also be specifically adapted for additional purposes, such as aesthetic or structural tasks that may be specific for various applications. This may include the geometric shape of the metal box 140, of the fastening means, etc. The present principles are useful for providing such specific adaptations.

As an example, the scaffolding element 100 may comprise through holes through the metal box 140, or a see-through window part. As another example, the scaffolding element 100 may comprise integrated lighting, that may be powered via cabling running through the intermediary part 50 as described above. Such cabling can be connected to the lightning means via cable channels provided through or otherwise via the metal box 140.

The present kit of parts may also comprise any additional parts useful for the particular purpose at hand.

In general, everything which is said regarding the different aspects of the present invention—the scaffolding element, the kit of parts and the method—is equally applicable across all three of these aspects.

Hence, the invention is not limited to the described embodiments, but can be varied within the scope of the enclosed claims.

The invention claimed is:

1. A scaffolding element with insulation, the scaffolding element comprising a metal frame of metal braces and a set of fastening means, arranged to fasten the scaffolding element to a supporting structure of a scaffolding structure, wherein the scaffolding element furthermore comprises a block of insulating material being cast around the metal frame so that insulating material of the block completely covers the metal frame but so that the fastening means protrude outside of a space occupied by the insulating material, and wherein the metal frame directly connects different ones of the fastening means arranged on opposite width-wise sides of the scaffolding element by a connected, rigid metal connection.

2. The scaffolding element of claim 1, wherein the block is substantially shaped as a parallelepiped.

3. The scaffolding element of claim 2, wherein block has a width and a height substantially corresponding to a corresponding width and height of the metal frame.

4. The scaffolding element of claim 3, wherein the block has a depth of at least 20 cm.

5. The scaffolding element of claim 1, wherein the insulating material is an expanded or foam plastic material.

6. The scaffolding element of claim 1, wherein the insulating material is covered on at least one side with a metal or rigid plastic foil material.

7. The scaffolding element of claim 6, wherein the insulating material is encapsulated in a metal box, the metal box being rigidly fastened to the fastening means.

8. The scaffolding element of claim 1, wherein the scaffolding element is a wall element, and in that the fastening means comprises four fasteners for fastening the wall element to a vertical supporting structure, of the scaffolding structure.

9. The scaffolding element of claim 1, wherein the scaffolding element is a floor element, and wherein the fastening means comprises four fasteners for fastening the floor element to a horizontal supporting structure of the scaffolding structure.

10. A scaffolding structure, wherein the scaffolding structure comprises at least one scaffolding element according to claim 1.

11. The scaffolding structure of claim 10, wherein the scaffolding structure comprises at least one wall in turn comprising several scaffolding elements according to claim 8.

12. The scaffolding structure of claim 10, wherein the scaffolding structure comprises at least one floor in turn comprising several scaffolding elements according to claim 9.

13. The scaffolding structure of claim 11, wherein the scaffolding structure further comprises at least one intermediate, insulated part, provided between two consecutive scaffolding elements according to claim 1, the intermediate part being arranged to be fastened to a cylindrical supporting structure of the scaffolding structure and to connect to the two consecutive scaffolding elements, hence creating, together with the two consecutive scaffolding elements, a connected insulated wall or floor.

14. The scaffolding structure of claim 13, wherein the intermediate part comprises a through channel for pipes or cables.

15. A method for manufacturing an insulated scaffolding element, comprising:
  a) providing a mold;
  b) providing a first scaffolding element, in turn comprising a metal frame of metal braces and a set of fastening means, arranged to fasten the scaffolding element to a supporting structure of a scaffolding structure, the metal frame directly connecting different ones of the fastening means arranged on opposite width-wise sides of the scaffolding element by a connected, rigid metal connection;
  c) arranging the first scaffolding element in the mold with the metal frame completely contained in the mold and its fastening means protruding out from the mold;
  d) filling the mold with insulating material; and
  e) allowing the insulating material to set into solid state to form a block of insulating material being cast around the metal frame so that insulating material of the block completely covers the metal frame but so that the fastening means protrude outside of a space occupied by the insulating material.

16. The method of claim 15, wherein the mold is open upwards and wherein the insulating material is provided into the mold as a liquid foam material.

17. The method of claim 16, further comprising covering the top of the mold, to form a closed encapsulating structure in relation to the insulating material.

18. The method of claim 15, wherein the mold is a hollow metal box, and wherein the method further comprises rigidly fastening the metal box to the first scaffolding element.

19. The method of claim 18, wherein the metal box is made from stainless steel or aluminum sheet material having a thickness in the range of 0.5 mm to 5 mm.

20. The method of claim 15, wherein the first scaffolding element has standard dimensions with respect to the location of the fastening means.

* * * * *